United States Patent
Kudo

(10) Patent No.: US 8,638,990 B2
(45) Date of Patent: Jan. 28, 2014

(54) STOP LINE RECOGNITION DEVICE

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 12/959,884

(22) Filed: Dec. 3, 2010

(65) Prior Publication Data

US 2011/0135155 A1 Jun. 9, 2011

(30) Foreign Application Priority Data

Dec. 9, 2009 (JP) ................................ 2009-279753

(51) Int. Cl.
*G06K 9/00* (2006.01)

(52) U.S. Cl.
USPC ........................................ 382/104; 382/190

(58) Field of Classification Search
USPC ................................................ 382/104, 190
See application file for complete search history.

(56) References Cited

U.S. PATENT DOCUMENTS

| | | | | |
|---|---|---|---|---|
| 5,161,107 A * | 11/1992 | Mayeaux et al. | ............. | 701/117 |
| 5,737,423 A * | 4/1998 | Manduley | ........................ | 705/67 |
| 5,987,174 A * | 11/1999 | Nakamura et al. | ............. | 382/199 |
| 6,906,484 B1 * | 6/2005 | Berroth et al. | ................ | 318/434 |
| 7,057,502 B2 * | 6/2006 | Kudo | ........................... | 340/435 |
| 7,068,154 B2 * | 6/2006 | Kudo | ........................... | 340/436 |
| 7,205,888 B2 * | 4/2007 | Isaji et al. | ..................... | 340/522 |
| 7,302,325 B2 * | 11/2007 | Kudo | ........................... | 701/36 |
| 7,512,252 B2 * | 3/2009 | Otsuka et al. | ................. | 382/104 |
| 7,548,634 B2 * | 6/2009 | Kudo | ........................... | 382/103 |
| 7,567,687 B2 * | 7/2009 | Kudo | ........................... | 382/103 |
| 7,734,275 B2 * | 6/2010 | Kubota et al. | ................. | 455/344 |
| 7,890,231 B2 * | 2/2011 | Saito et al. | ..................... | 701/41 |
| 7,899,213 B2 * | 3/2011 | Otsuka et al. | ................. | 382/104 |
| 7,957,559 B2 * | 6/2011 | Shima et al. | .................. | 382/104 |
| 8,050,460 B2 * | 11/2011 | Mueller-Schneiders et al. | .............................. | 382/104 |
| 8,185,296 B2 * | 5/2012 | Yokoyama et al. | ............ | 701/117 |
| 8,224,550 B2 * | 7/2012 | Kudo | ........................... | 701/96 |
| 8,248,220 B2 * | 8/2012 | Nagamine et al. | ............ | 340/435 |
| 8,254,635 B2 * | 8/2012 | Stein et al. | ..................... | 382/103 |
| 8,311,729 B2 * | 11/2012 | Saito et al. | ..................... | 701/300 |
| 8,532,880 B2 * | 9/2013 | Kudo et al. | ..................... | 701/42 |
| 2003/0189499 A1 * | 10/2003 | Stricklin et al. | ............... | 340/933 |
| 2003/0190058 A1 * | 10/2003 | Jun et al. | ........................ | 382/104 |
| 2004/0091133 A1 * | 5/2004 | Monji | ........................... | 382/104 |

(Continued)

FOREIGN PATENT DOCUMENTS

| | | | | | |
|---|---|---|---|---|---|
| JP | | 11134120 A | * | 5/1999 | ................ G06F 3/12 |
| JP | | 2005-170154 | | 6/2005 | |
| JP | | 2006024105 A | * | 1/2006 | |
| JP | | 2011123613 A | * | 6/2011 | |

*Primary Examiner* — Jayesh A Patel
*Assistant Examiner* — Iman K Kholdebarin
(74) *Attorney, Agent, or Firm* — Smith, Gambrell & Russell, LLP.

(57) ABSTRACT

An image processing unit 4 performs the recognition of a traffic signal in front of an own vehicle on the carriageway thereof. When the image processing unit 4 recognizes that there is a traffic signal front closet to the vehicle on the carriageway within a set distance L2 and the traffic signal is displaying red light, the process shifts to a stop line recognition mode and the image processing unit 4 performs stop line recognition. Accordingly, unnecessary execution of stop line recognition can be accurately avoided. Therefore, a stop line that is necessary for the control of the own vehicle can be recognized with a high accuracy without generating excessive calculation load.

21 Claims, 6 Drawing Sheets

(56) References Cited

U.S. PATENT DOCUMENTS

| | | | |
|---|---|---|---|
| 2004/0203895 A1* | 10/2004 | Balasuriya | 455/456.1 |
| 2005/0123173 A1* | 6/2005 | Isaji et al. | 382/104 |
| 2006/0215882 A1* | 9/2006 | Ando et al. | 382/106 |
| 2006/0269104 A1* | 11/2006 | Ciolli | 382/104 |
| 2007/0041614 A1* | 2/2007 | Tanji | 382/104 |
| 2007/0069873 A1* | 3/2007 | Kudo | 340/435 |
| 2007/0233386 A1* | 10/2007 | Saito et al. | 701/300 |
| 2008/0319612 A1* | 12/2008 | Kudo | 701/42 |
| 2009/0274000 A1* | 11/2009 | Pekny et al. | 365/226 |
| 2009/0278933 A1* | 11/2009 | Maeda et al. | 348/148 |
| 2009/0309972 A1* | 12/2009 | Tonokawa et al. | 348/148 |
| 2010/0026804 A1* | 2/2010 | Tanizaki et al. | 348/148 |
| 2010/0061641 A1* | 3/2010 | Schneider | 382/224 |
| 2011/0135155 A1* | 6/2011 | Kudo | 382/104 |
| 2011/0182473 A1* | 7/2011 | Wang | 382/103 |
| 2012/0140115 A1* | 6/2012 | Kudo | 348/374 |
| 2013/0022245 A1* | 1/2013 | Sivertsen | 382/104 |

\* cited by examiner

STOP LINE RECOGNITION DEVICE

CROSS REFERENCES TO RELATED APPLICATIONS

The present application claims priority from Japanese Patent Application No. 2009-279753 filed on Dec. 9, 2009, the entire contents of which are hereby incorporated by reference

BACKGROUND OF THE INVENTION

1. Field of the Invention

The present invention relates to stop line recognition devices that recognize a stop line in front of the carriageway of a vehicle.

2. Description of the Related Art

In recent years, various driving support systems for vehicles have been under development as part of efforts of the Intelligent Transport System (ITS). For example, Japanese Unexamined Patent Application Publication No. 2005-170154 (hereunder referred to as "Patent Document 1") discloses a technology that performs image recognition such as template matching to an image signal captured by a charge-coupled device (CCD) camera to extract a specific object that indicates that an own vehicle should stop, and performs driving support for having the vehicle stop based on the extracted specific object. According to the technology of Patent Document 1, a stop lamp of a preceding vehicle that is emitting light to indicate that the preceding vehicle is performing a braking operation, a traffic signal displaying red light and a stop sign and the like are detected as the specific object and the position of a stop line, and further the like is recognized.

Since the stop line provided on the road is generally used only as marker for stopping at an intersection and the like, and, unlike a preceding vehicle and a traffic signal, is not an object for directly determining whether it is necessary for the vehicle to stop or not, there is little need to constantly recognize the stop line upon performing driving support such as stop control of the own vehicle.

Therefore, if the recognition of the stop line is constantly performed at a level similar to a level for the preceding vehicle, traffic signal and the like, unnecessary calculation load may be increased, which may result in a very longer processing time of driving support control itself and the like.

Furthermore, for example, when a plurality of roadside trees' shadows cross over the carriageway of the own vehicle, a light and dark pattern created on the road by the shadows may be erroneously recognized as the stop line on an image: the constant recognition of the stop line may also decrease the recognition accuracy of the stop line.

SUMMARY OF THE INVENTION

The present invention is made in view of the above, and it is an object of the present invention to provide a stop line recognition device that recognizes a top line necessary for the control of an own vehicle with a high accuracy.

A stop line recognition device according to an embodiment of the present invention is comprised of capturing means for capturing an image of front environment outside an own vehicle including a carriageway thereof, stop line recognition means for recognizing a stop line on the carriageway of the vehicle based on an image captured by the capturing means, traffic signal recognition means for recognizing a traffic signal in front of the carriageway of the own vehicle and permission determining means for permitting the stop line recognition means to execute stop line recognition when the traffic signal recognition means detects that the traffic signal front closest to the own vehicle on the carriageway thereof is displaying red light.

According to an aspect of the present invention, the stop line recognition device can recognize a stop line that is necessary for the control of the own vehicle with a high accuracy without generating excessive calculation load.

DESCRIPTION OF THE PREFERRED EMBODIMENTS

Figure 1:
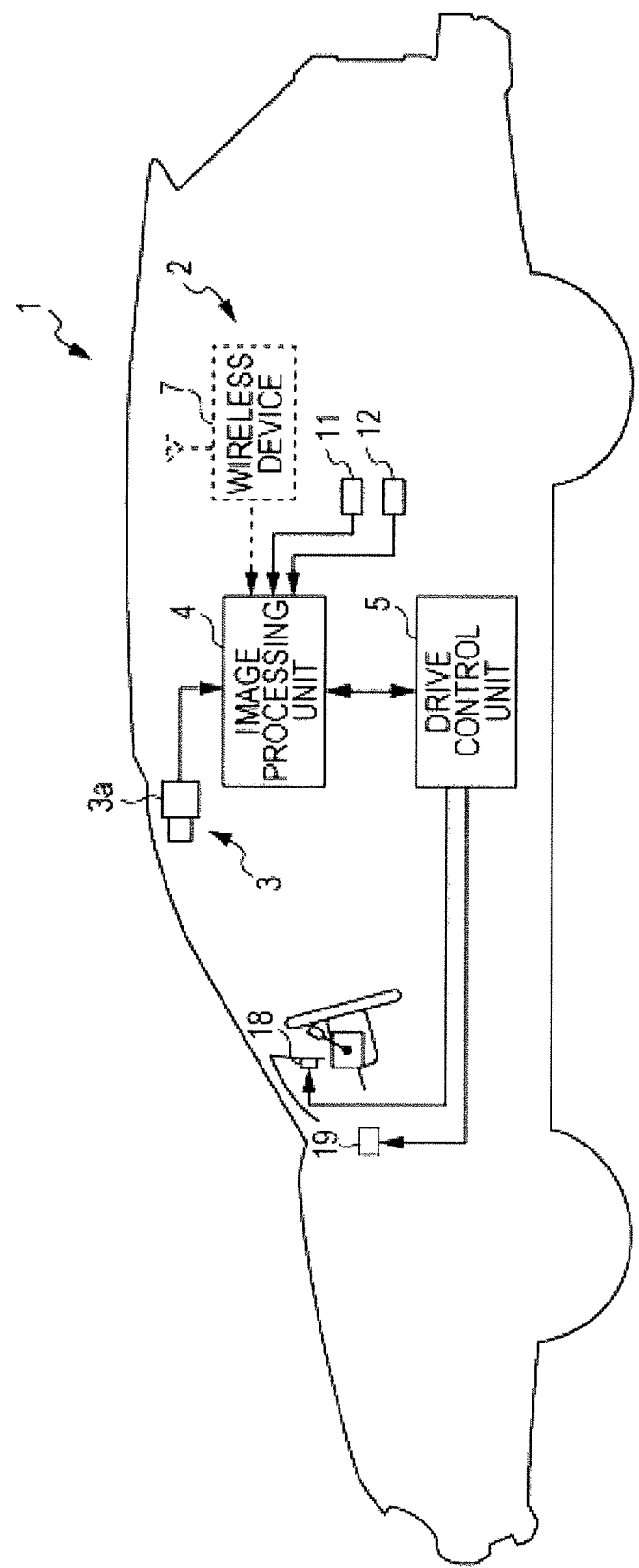
FIG. 1 is a schematic block diagram of a stop line recognition device according to a first embodiment of the present invention.
Figure 2:
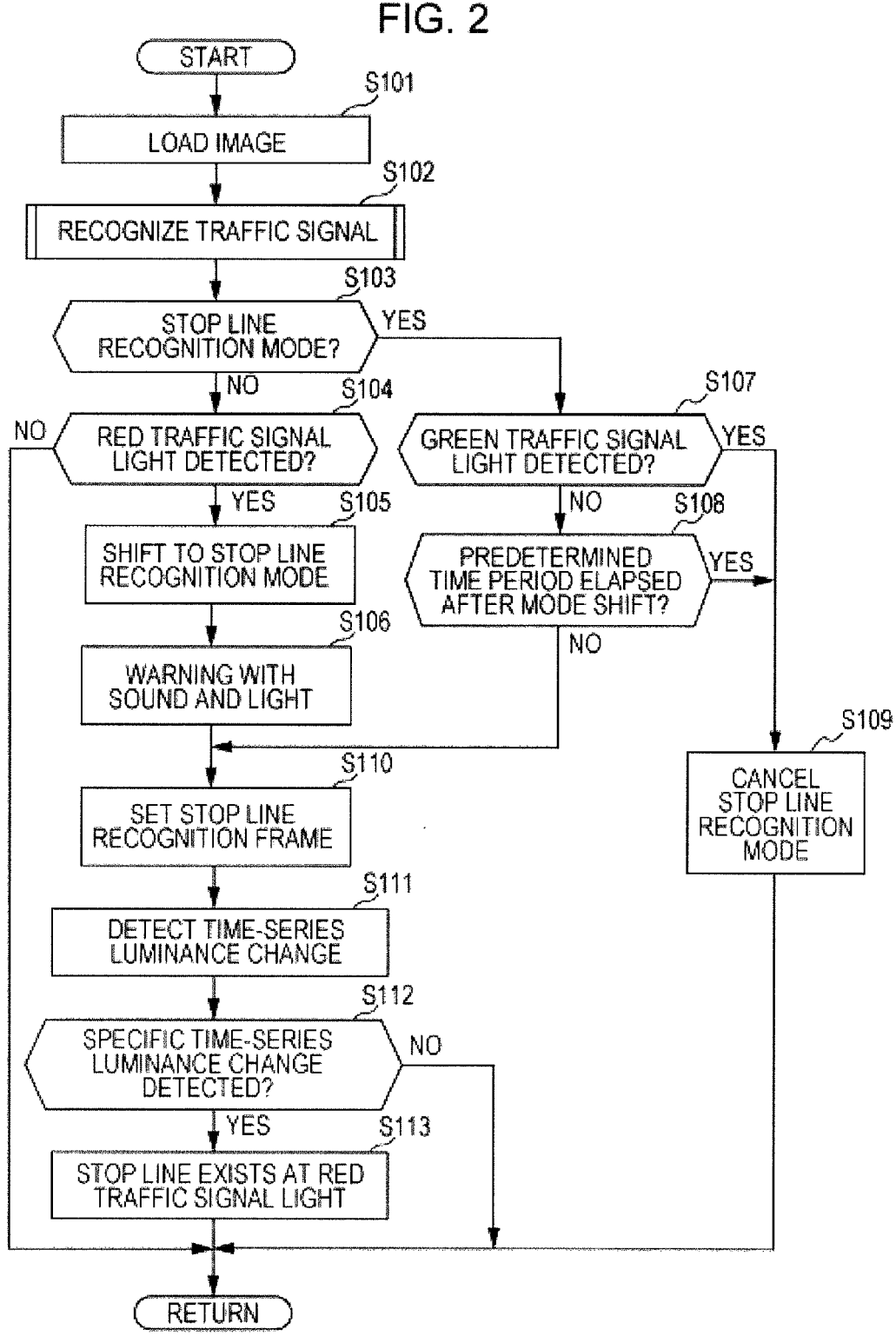
FIG. 2 is a flowchart showing a stop line recognition routine for the stop line recognition device according to the first embodiment of the present invention.
Figure 3:
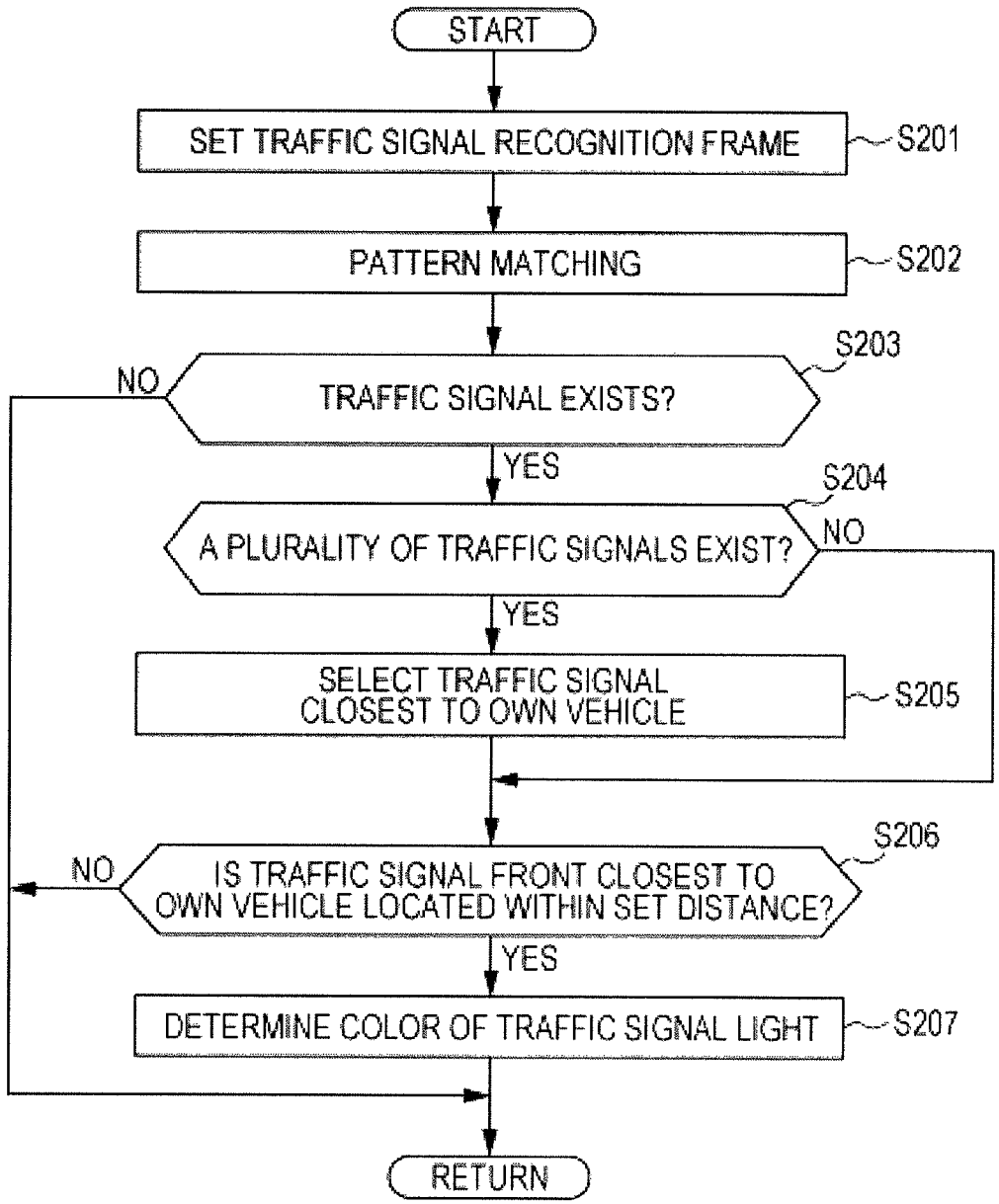
FIG. 3 is a flowchart showing a traffic signal recognition subroutine for the stop line recognition device according to the first embodiment of the present invention.
Figure 4:
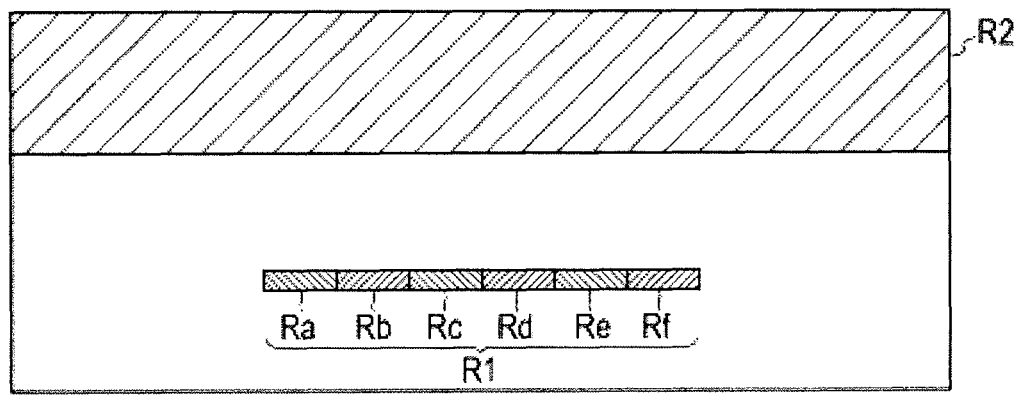
FIG. 4 is an illustrative view showing a traffic signal recognition frame and a stop line recognition frame for the stop line recognition device according to the first embodiment of the present invention.
Figure 5:
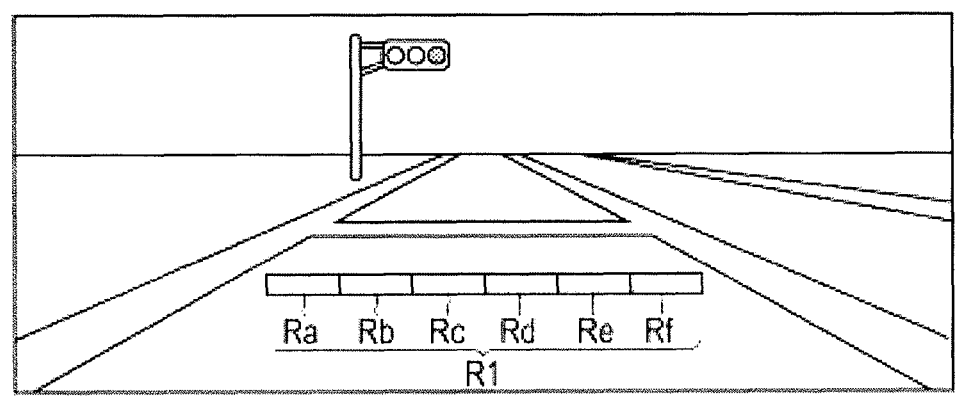
FIG. 5 is an illustrative view showing an example of the stop line recognition frame that is set on an image for the stop line recognition device according to the first embodiment of the present invention.

Embodiments of the present invention will hereunder be described with reference to the drawings. FIGS. 1 to 5 relate to a stop line recognition device according to a first embodiment of the present invention: FIG. 1 is a schematic block diagram of the stop line recognition device; FIG. 2 is a flowchart showing a stop line recognition routine; FIG. 3 is a flowchart showing a traffic signal recognition subroutine; FIG. 4 is an illustrative view showing a traffic signal recognition frame and a stop line recognition frame; FIG. 5 is an illustrative view showing an example of the stop line recognition frame that is set on an image.

In FIG. 1, a stop line recognition device 2 installed on a vehicle such as an automobile (own vehicle) 1 is mainly composed of an image capturing optical system 3, an image processing unit 4 and a drive control unit 5.

The image capturing optical system 3 is, for example, mainly composed of a monocular camera 3a that is mounted in a front ceiling of the own vehicle's compartment as the capturing means and captures an image of front environment outside the own vehicle including a carriageway thereof. The camera 3a of this embodiment is, for example, composed of a color camera utilizing a color CCD. The capturing image, optical axis and the like of the camera 3a are configured such that the carriageway of the own vehicle is positioned in a lower region on a captured color image and, when there is a traffic signal or the like on the carriageway of the vehicle, the traffic signal or the like is positioned in a upper region of the captured color image.

The image processing unit 4 recognizes a stop line on the road according to the stop line recognition routine which will be described later. In this stop line recognition process, the image processing unit 4 firstly examines whether a traffic signal is located in front of the carriageway of the own vehicle. When the image processing unit 4 recognizes that there is a traffic signal on the carriageway of the vehicle and the traffic signal front closest to the own vehicle on the carriageway thereof is displaying red light, the stop line recognition process shifts to a stop line recognition mode.

When the process shifts to the stop line recognition mode, the image processing unit 4 sets a stop line recognition frame R1 in a lower region of an image input from the image capturing optical system 3, the frame which extends in the vehicle width direction (see FIG. 4). Then the image processing unit 4 recognizes the stop line based on time-series change of luminance in the stop line recognition frame R1. The stop line recognition frame R1 is, for example, an elongated observation frame composed of six small regions Ra, Rb, Rc, Rd, Re and Rf that are aligned in the vehicle width direction. When the carriageway of the own vehicle is a flat road, The stop line recognition frame R1 is disposed so as to correspond to a region on the image indicating a road surface ahead of the vehicle by a set distance L1 (for example, 10 meter ahead). Then the image processing unit 4 determines that there is a stop line, for example, when in at least three consecutive small regions among the six small regions Ra to Rf (that is, any of Ra, Rb and Rc, Rb, Rc and Rd, Rc, Rd and Re, or Rd, Re and Rf) a luminance average changes from low to high, then to low. Here, in order to accommodate a short stop line, a condition that luminance changes simultaneously in all the six small regions Ra to Rf is not employed. Further, in this condition, even when a stop line is long, either of the end small regions may stray from the stop line unless the own vehicle 1 enters substantially perpendicularly towards the stop line. A threshold used as a comparison reference for determining whether the luminance average of three consecutive small regions among the six small regions Ra to Rf increases or decreases is changed variably according to the driving condition: for example, in the daytime sunshine, the threshold is set to a relatively large vale; in the daytime shade (for example, when the luminance average of the entire stop line frame R1 is low and headlights are turned off), the threshold is set to a small value; and at night the threshold is set to a relatively large vale.

Here, for example, when the own vehicle is equipped with a wireless device 7 shown with a dashed line in FIG. 1 that is capable of road-to-vehicle communication with road ancillary facilities and vehicle-to-vehicle communication with other vehicles and the like, the image processing unit 4 can recognize a traffic signal on the carriageway of the own vehicle 1 based on information of the outside of the vehicle collected through the wireless device 7. However, in the present embodiment, in which a color image is captured by the image capturing optical system 3, a traffic signal recognition frame R2 is set in an upper region of the image (see FIG. 4) and traffic signal recognition is performed based on processing such as pattern matching (template matching) to the traffic signal recognition frame R2.

As described above, in the present embodiment, the image processing unit 4 has functions of stop line recognition means, traffic signal recognition means and permission determining means.

The drive control unit 5 is connected, for example, to a warning lamp 18 and a warning buzzer 19 and the like that are arranged on a combination meter. For example, when the image processing unit 4 detects a stop line (that is, when a traffic signal front closest to the own vehicle 1 on the carriageway thereof is displaying red light and a stop line is detected ahead of the own vehicle 1 by the set distance L1 (for example, 10 meter ahead), the drive control unit 5 outputs a warning through the warning lamp 18 and the warning buzzer 19 according to need. In addition to the warning output, the drive control unit 5 can also perform throttle valve control and braking control by brake intervention for the stop line.

Stop line recognition control executed by the image processing unit 4 will be described according to the flowchart of the stop line recognition routine shown in FIG. 2. This routine is repeatedly executed at every set time. When the routine starts, in step S101 the image processing units 4 firstly loads an image signal in front of the vehicle captured by the image capturing optical system 3.

In next step S102, the image processing units 4 performs traffic signal recognition based on the loaded image signal. This traffic signal recognition is performed according to the flowchart of the traffic signal recognition subroutine shown in FIG. 3, for example. When the subroutine starts, in step S201 the image processing unit 4 sets the traffic signal recognition frame R2 in an upper region of the image (see FIG. 4).

When the subroutine proceeds from step S201 to step S202, the image processing units 4 performs pattern matching or the like to a pixel group in the traffic signal recognition frame R2 and extraction of a traffic signal. Then the subroutine proceeds to step 203.

In step S203, the image processing unit 4 determines whether a traffic signal has been extracted on the carriageway of the vehicle or not. When the image processing unit 4 determines that a traffic signal has not been extracted, the subroutine ends. Here, for example, the image processing unit 4 can estimate a traveling direction of the own vehicle 1 based on a vehicle speed thereof V detected by a vehicle speed sensor 11 and a yaw rate γ detected by a yaw rate sensor 12, and estimate a carriageway of the own vehicle on the image based on the estimated traveling direction. Or, for example, the image processing unit 4 can perform stop line recognition on the image by well-known pattern matching or the like and estimate a carriageway of the own vehicle based on a recognized stop line.

In step S203, on the other hand, when the image processing unit 4 determines that a traffic signal has not been extracted on the carriageway of the own vehicle, the subroutine proceeds to step S204 and the image processing unit 4 examines whether a plurality of traffic signals have been detected on the carriageway of the own vehicle or not.

Then in step S204, when the image processing unit 4 determines that only a single traffic signal has been detected, the subroutine proceeds to step S206. When the image processing unit 4 determines that a plurality of traffic signals have been detected, the subroutine proceeds to step S205.

When the subroutine proceeds from step S204 to step S205, the image processing unit 4 selects the traffic signal closest to the own vehicle 1 among the traffic signals on the carriageway of the own vehicle 1. Then subroutine proceeds to step S205. Generally traffic signals on the road are substantially uniform in size and thus the image processing unit 4 can calculate distances from the own vehicle 1 to the traffic signals based on the size of the traffic signals extracted on the image.

Then when the subroutine proceeds from step S204 or step S205 to step S206, the image processing unit 4 examines whether the traffic signal which is extracted on the carriageway of the own vehicle 1 and the front closest thereto is located within a set distance L2 (L2>L1) from the own vehicle 1 or not.

Then in step 206, the image processing unit 4 determines that the front closest traffic signal on the carriageway of the own vehicle 1 is located far therefrom by the set distance L2 or more, the subroutine ends.

In step S206, on the other hand, when the image processing unit 4 determines that the front closest traffic signal on the carriageway of the own vehicle 1 is located therefrom within a set distance L2 or less, the subroutine proceeds to step S207. The image processing unit 4 determines the color of the light that the closest traffic signal is displaying (that is, whether the closest traffic signal is displaying red light or not), and then the subroutine ends.

In the main routine shown in FIG. 2, when the routine proceeds from step S102 to step S103, the image processing unit 4 examines whether the current control state is the stop line recognition mode or not. When the image processing unit 4 determines that the current control state is not the stop line recognition mode, the routine proceeds to step S104. When the image processing unit 4 determines that the current control state is the stop line recognition mode, the routine proceeds to step S107.

When the routine proceeds from step S103 to step S104, the image processing unit 4 examines whether a traffic signal displaying red light is detected just before the own vehicle on the carriageway thereof in the above step S102 (that is, whether the traffic signal front closest to the own vehicle is detected within the set distance L2 from the own vehicle 1 on the carriageway thereof and the traffic signal is displaying a red signal or not).

Then in step S104, when the image processing unit 4 determines that a traffic signal displaying red light is not detected just before the own vehicle on the carriageway thereof (that is, when the image processing unit 4 determines that the traffic signal front closest to the own vehicle is not located within the set distance L2 from the own vehicle 1 on the carriageway thereof, or when the traffic signal closest to the own vehicle on the carriageway thereof is located within the set distance L2 or less from the own vehicle but the traffic signal is displaying other than red light, or the like), the routine ends.

In step S104, on the other hand, when the image processing unit 4 determines that a traffic signal displaying red light is detected just before the own vehicle on the carriageway thereof, the routine proceeds to step S105, and the image processing unit 4 shifts the control state to the stop line recognition mode. And in next step S106, the image processing unit 4 warns the driver that the control state has been shifted to the stop line recognition mode with light and sound emitted by the warning lamp 18 and the warning buzzer 19 or the like. Then the routine proceeds to step S110.

When the routine proceeds from step S103 to step S107, the image processing unit 4 examines whether a traffic signal displaying green light is detected jest before the own vehicle 1 on the carriageway thereof (that is, whether a traffic signal is detected on the carriageway within the set distance L2 from the vehicle and the traffic signal is displaying green light or not).

Then in S107, when the image processing unit determines that a traffic light displaying green light is detected just before the own vehicle on the carriageway thereof, the routine proceeds to step S107.

In step S107, on the other hand, when the image processing unit 4 determines that a traffic signal displaying green light is not detected just before the own vehicle on the carriageway thereof (that is, when a traffic signal itself is not detected within the set distance L2 from the vehicle on the carriageway, when a traffic signal is detected within the set distance L2 from the own vehicle on the carriage and the traffic signal is displaying red light, or the like), the routine proceeds to step S108 and the image processing unit 4 examines whether time elapsed from when the control state was shifted to the stop line recognition mode is equal to or longer than a predetermined time period.

Then in step S108, when the image processing unit 4 determines that time elapsed from when the control state was shifted to the stop line recognition mode is equal to or longer than a predetermined time period, the routine proceeds to step S109. When the image processing unit 4 determines that time elapsed from when the control state was shifted to the stop line recognition mode is shorter than a predetermined time period, the routine proceeds to step S110.

Then when the routine proceeds from step S107 or step S108 to step S109, the image processing unit 4 cancels the stop line recognition mode and the routine ends. More specifically, the case in which a traffic signal displaying green light in step S107 represents that a traffic signal front closest to the vehicle on the carriageway thereof was previously displaying red light and has changed to green light. In this case, since it can be considered that the need for stopping the own vehicle 1 at the stop line has been alleviated, the image processing unit 4 cancels the stop line recognition mode. Furthermore, in step S108, it is assumed that the case in which the time elapsed from when the control state was shifted to the stop line recognition mode is equal to or longer than a predetermined time period specifically represents that the driver has already responded to the front closest traffic signal displaying red light on the carriageway of the own vehicle 1 and stopped the vehicle, the driver is performing deceleration to stop the vehicle, the driver has already recognized the stop line, or the like. Thus, the image processing unit cancels the stop line recognition mode.

On the other hand, when the routine proceeds from step S106 or step S108 to step S110, the image processing units 4 sets the stop line recognition frame R1 on the image loaded in step S101 (see FIG. 5).

In next step 111, the image processing unit 4 calculates a luminance average of each of the small regions Ra to Rf in the stop line recognition frame R1 and detects a time-series change of the luminance average of each of the small regions Ra to Rf.

Then when the routine proceeds to step S112, the image processing unit 4 examines whether a specific time-series change of the luminance has been detected in step S111 (that is, whether in at least three consecutive small regions among the six small regions a luminance average changes in a time series from low to high, then to low over a predetermined determination time period T or not). When the image processing unit 4 determines that a specific time-series change of the luminance average has not been detected, the routine ends. Here the determination time T is preferably set variable according to the own vehicle speed V detected by the vehicle speed sensor 11. More specifically, it is preferable to set such that the determination time T becomes shorter as the own vehicle speed becomes higher.

In step S112, on the other hand, when the image processing unit 4 determines that a specific time-series change of the luminance average has been detected, the routine proceeds to step S113 and the image processing unit 4 determines that there is a stop line at the position of the image which corresponds to the small regions where the specific time-series change of luminance has been detected. Then the routine ends.

According to this embodiment, in which recognition of a traffic signal in front of the carriageway of the own vehicle is performed and, when it is recognized that the traffic signal closest to the own vehicle on the carriageway thereof is located within the set distance L2 therefrom and the traffic signal is displaying red light, the process shifts to the stop line recognition mode and the stop line recognition is performed, unnecessary execution of stop line recognition can be accurately avoided. Accordingly, a stop line that is necessary for the control of the own vehicle 1 can be recognized with a high accuracy without generating excessive calculation load. More specifically, unnecessary stop line recognition can be accurately avoided by executing stop line recognition only in the case in which the traffic signal front closest to the own vehicle on the carriageway thereof is displaying red light. Furthermore, since stop line recognition is not executed when there is no traffic signal just before the own vehicle on the carriage thereof, misrecognition of a stop line on a road where actually there cannot be a stop line and the like can be prevented, which can lead to improvement of recognition accuracy of a stop line.

In this embodiment, the image capturing system 3 is mainly configured with the monocular camera 3a composed of a color camera and the like and processing such as pattern matching is performed to an upper region on a captured color image. Accordingly, recognition of a traffic signal on the carriageway of a vehicle can be accomplished without adding a new device and the like.

Figure 6:
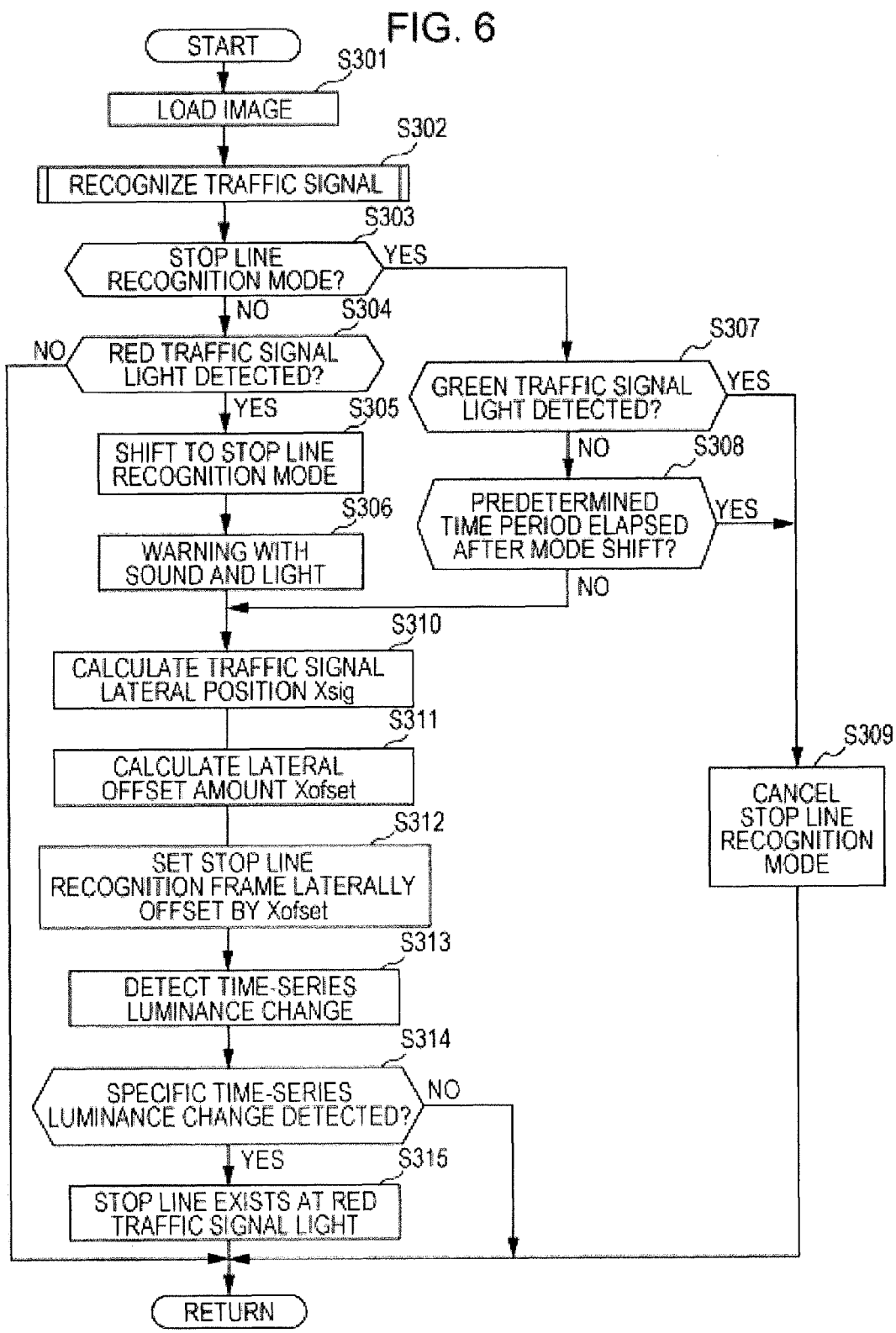
FIG. 6 is a flowchart showing a stop line recognition routine for the stop line recognition device according to a second embodiment of the present invention.
Figure 7:
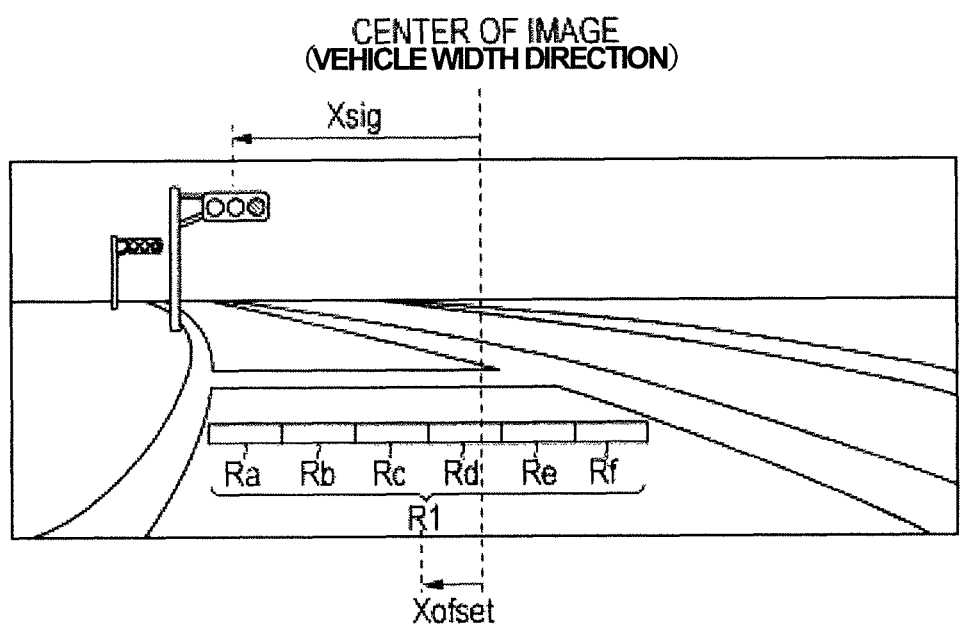
FIG. 7 is an illustrative view showing an example of the stop line recognition frame that is set on an image for the stop line recognition device according to the second embodiment of the present invention.

FIGS. 6 and 7 relate to a second embodiment of this invention. FIG. 6 is a flowchart showing a stop line recognition routine, and FIG. 7 is an illustrative view showing an example of the stop line recognition frame set on an image. The second embodiment is different from the first embodiment mainly in the point that the position of the stop line recognition frame R1 is variably set in the vehicle width direction according to a position of a traffic signal detected just before the own vehicle on the carriage thereof. A detailed description has been omitted for configurations and processes of the second embodiment that are similar to the configurations and processes of the first embodiment.

In this embodiment, stop line recognition control executed by the image processing unit 4 is repeatedly executed at every set time according to the flowchart of the stop line recognition routine shown in FIG. 6. When the routine starts, in steps S301 to S309 the image processing units 4 performs processing similar to processing in steps S101 to S109 in the first embodiment.

When the routine proceeds from step S306 or step S308 to step S310, the image processing unit 4 calculates a distance on the image from the center in the vehicle width direction to a traffic signal that is the front closest to the vehicle on the carriageway thereof and displaying red light as a traffic signal lateral position Xsig (see FIG. 7)

Then when the routine proceeds from step S310 to step S311, the image processing unit 4 calculates an offset amount in the lateral direction Xofset of the stop line recognition frame R1 by multiplying the traffic signal lateral position Xsig by a predetermined gain Gx. Then in next step S312, the image processing unit 4 sets the stop line recognition frame R1 at a position offset from the center of the image by Xofset in the vehicle direction (See FIG. 7).

Then the image processing unit 4 uses the stop line recognition frame R1 set in step S312 to perform processing similar to the processing performed in steps S111 to step S113, and then the routine ends.

According to this embodiment, in which the stop line recognition frame R1 can be set at a preferred position that accommodates even a curve and the like in front of the own vehicle by setting the stop line recognition frame R1 based on the position in the vehicle width direction of a traffic signal just before the own vehicle on the carriageway thereof, recognition accuracy of a stop line can be further improved. In particular in this case, since the position of the stop line recognition frame R1 can be variably set based on the position in the vehicle width direction of a traffic signal just before the own vehicle on the carriageway, the relationship between the traffic signal and the stop line recognition frame R1 can be made with a high accuracy.

What is claimed is:

1. A stop line recognition device comprising:
   capturing means for capturing an image of a front environment outside an own vehicle including a carriageway of the own vehicle;
   stop line recognition means for recognizing a stop line on the carriageway of the own vehicle based on an image captured by the capturing means;
   traffic signal recognition means for recognizing one or more traffic signals in front of the own vehicle, along the carriageway of the own vehicle; and
   permission determining means for permitting the stop line recognition means to execute a stop line recognition operation based on a detection, by the traffic signal recognition means, that a traffic signal that is in front of the own vehicle, along the carriageway of the own vehicle, and closest to the own vehicle is displaying a red light, wherein
   the permission determining means is configured such that when the traffic signal that is in front of the own vehicle, along the carriageway of the own vehicle, and closest to the own vehicle changes to green after the permission determining means permits the stop line recognition means to execute a stop line recognition operation, the permission determining means cancels the permission to execute the stop line recognition operation.

2. The stop line recognition device according to claim 1 wherein the stop line recognition means is configured to set a stop line recognition frame on an image captured by the capturing means that extends in the vehicle width direction, and to recognize a stop line based on a time-series change of luminance in the stop line recognition frame.

3. A stop line recognition device comprising:
   capturing means for capturing an image of a front environment outside an own vehicle including a carriageway of the own vehicle;
   stop line recognition means for recognizing a stop line on the carriageway of the own vehicle based on an image captured capturing means;
   traffic signal recognition means for recognizing one or more traffic signals in front of the own vehicle, along the carriageway of the own vehicle; and
   permission determining means for permitting the stop line recognition means to execute a stop line recognition operation based on a detection, by the traffic signal recognition means, that a traffic signal that is in front of the own vehicle, along the carriageway of the own vehicle, and closest to the own vehicle is displaying a red light, wherein
   the stop line recognition means is configured to set a stop line recognition frame on an image captured by the capturing means, with the stop line recognition frame extending in the vehicle width direction and being variably positioned on the image based on the position on the image of the traffic signal that is in front of the own vehicle, along the carriageway of the own vehicle, and closest to the own vehicle, as recognized by the traffic signal recognition means, and
   the stop line recognition means is configured to recognize the stop line based on a time-series change of luminance in the stop line recognition frame.

4. The stop line recognition device according to claim 2, wherein the stop line recognition means is configured to detect a change in luminance in the stop line recognition frame, in a time series, from below a predetermined luminance to above the predetermined luminance, then to below the predetermined luminance over a predetermined determination time period, and the stop line recognition means is configured to determine that there is a stop line in the region of the image where the luminance in the stop line recognition frame changed to above the predetermined luminance.

5. The stop line recognition device according to claim 3, wherein the stop line recognition means is configured to detect a change in luminance in the stop line recognition frame, in a time series, from below a predetermined luminance to above the predetermined luminance, then to below the predetermined luminance over a predetermined determination time period, and the stop line recognition means is configured to determine that there is a stop line in the region of the image where the luminance in the stop line recognition frame changed to above the predetermined luminance.

6. The stop line recognition device according to claim 4, wherein the stop line recognition means is configured to variably set the determination time period such that the determination time period becomes shorter as the own vehicle speed becomes higher.

7. The stop line recognition device according to claim 5, wherein the stop line recognition means is configured to variably set the determination time period such that the determination time period becomes shorter as the own vehicle speed becomes higher.

8. A stop line recognition device comprising:

capturing means for capturing an image of a front environment outside an own vehicle including a carriageway of the own vehicle;

stop line recognition means for recognizing a stop line on the carriageway of the own vehicle based on an image captured by the capturing means;

traffic signal recognition means for recognizing one or more traffic signals in front of the own vehicle, along the carriageway of the own vehicle; and permission determining means for permitting the stop line recognition means to execute a stop line recognition operation based on a detection, by the traffic signal recognition means, that a traffic signal that is in front of the own vehicle, along the carriageway of the own vehicle, and closest to the own vehicle is displaying a red light, wherein the permission determining means is configured such that when a predetermined time period elapses after the permission determining means permits the stop line recognition means to execute a stop line recognition operation, the permission determining means cancels the permission to execute the stop line recognition operation.

9. The stop line recognition device according to claim 4, further comprising a drive control means for executing a drive control of the own vehicle, wherein the drive control means is configured such that:

when the traffic signal recognition means detects that the traffic signal that is in front of the own vehicle, along the carriageway of the own vehicle, and closest to the own vehicle is displaying a red light, and when the stop line recognition means determines that there is a stop line in a region of the image, the drive control means executes a control operation of the own vehicle.

10. The stop line recognition device according to claim 5, further comprising a drive control means for executing a drive control of the own vehicle, wherein the drive control means is configured such that:

when the traffic signal recognition means detects that the traffic signal that is in front of the own vehicle, along the carriageway of the own vehicle, and closest to the own vehicle is displaying a red light, and when the stop line recognition means determines that there is a stop line in a region of the image, the drive control means executes a control operation of the own vehicle.

11. The stop line recognition device according to claim 9, wherein the drive control means is configured to execute as the control operation a warning signal to a driver of the own vehicle.

12. The stop line recognition device according to claim 9, wherein the drive control means is configured to execute as the control operation a throttle control of the own vehicle.

13. The stop line recognition device according to claim 9, wherein the drive control means is configured to execute as the control operation a brake control of the own vehicle.

14. The stop line recognition device according to claim 9, wherein the drive control means is configured to execute as the control operation a combination of at least two of the following operations: a warning signal to a driver of the own vehicle; a throttle control of the own vehicle; and a brake control of the own vehicle.

15. The stop line recognition device according to claim 10, wherein the drive control means is configured to execute as the control operation a warning signal to a driver of the own vehicle.

16. The stop line recognition device according to claim 10, wherein the drive control means is configured to execute as the control operation a throttle control of the own vehicle.

17. The stop line recognition device according to claim 10, wherein the drive control means is configured to execute as the control operation a brake control of the own vehicle.

18. The stop line recognition device according to claim 10, wherein the drive control means is configured to execute as the control operation a combination of at least two of the following operations: a warning signal to a driver of the own vehicle; a throttle control of the own vehicle; and a brake control of the own vehicle.

19. The stop line recognition device according to claim 1, wherein the stop line recognition device is mounted to the own vehicle.

20. The stop line recognition device according to claim 3, wherein the capturing means is configured to capture a color image.

21. The stop line recognition device according to claim 3, wherein the stop line recognition means is configured to variably position the stop line recognition frame, at least in lateral directions of the image, based on the position on the image of the traffic signal that is in front of the own vehicle, along the carriageway of the own vehicle, and closest to the own vehicle, as recognized by the traffic signal recognition means.

* * * * *